July 30, 1946.    C. R. FABEN    2,405,092
AIRCRAFT LANDING RUNWAY
Filed May 31, 1943
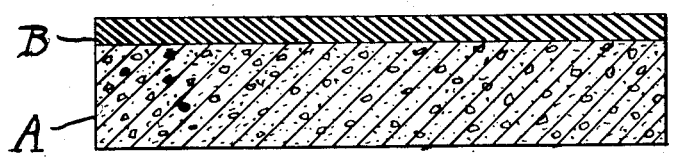
INVENTOR
Charles R. Faben
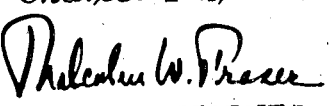
ATTORNEY Patented July 30, 1946

2,405,092

UNITED STATES PATENT OFFICE 2,405,092

AIRCRAFT LANDING RUNWAY

Charles R. Faben, Toledo, Ohio

Application May 31, 1943, Serial No. 489,195

6 Claims. (Cl. 94—7)

This invention relates to airplane runways but more particularly to the reduction or prevention of damage to airplane tires ordinarily experienced during landing operations on prepared runways.

In landing a plane, its speed must be greater than its critical or air speed because otherwise the airplane falls. The speed required in landing an airplane varies for each type of plane but in general the heavier and faster a plane is, the higher is the critical landing speed. Manifestly when an airplane is in flight, the wheels are at rest except for inconsequential rotation of the wheels due to air friction. However, at the instant the wheels are brought into contact with the ground surface during the landing operations, they must at once attain a peripheral speed equal to the speed of the plane. The energy representing the work done to overcome the inertia of the wheels comes from the energy stored in the moving mass of the airplane and the stored energy is far in excess of that required to set the wheels in motion and to bring them up to the necessary speed.

This application of energy and inertia of the wheel assembly and tires creates tremendous friction between the tires and runway surface. This friction releases part of the excess energy as heat which not infrequently raises the temperature of the tires above the decomposition point of the rubber, this phenomenon being shown by the puff of smoke that ordinarily appears when the tires of a plane touch the surface of the runway. As a result, the life of these tires is unduly shortened and in a relatively short time they must be replaced.

An object of this invention is to produce a surface for the runways for aircraft which will obviate the difficulties and objections above described, thereby militating against damage or injury to the airplane tires during the landing operations.

For purposes of illustration, an embodiment of the invention is shown in the accompanying drawing in which the figure is a fragmentary sectional view of a runway.

In accordance with this invention, the surface of a prepared runway for airplanes indicated at A, whether of concrete, asphalt, stone or the like, is coated as indicated at B with an organic material which will soften, melt or become substantially plastic at the temperature produced at the point of contact by the airplane wheels when the airplane lands, thereby employing the excess released energy to do the work of melting or rendering the material substantially plastic without raising its temperature sufficiently to damage the tire. By selecting the proper organic material as the runway surfacing B, and employing it in the right quantity, the temperature attained by contact between the airplane tires and the material will be such that the rubber or other material forming the tire tread can withstand it without damage or injury. It will be recognized that instead of damaging or injuring the tire, depressions may be formed in the surface of the runway but these can be readily remedied or, in some cases, the plasticity of the material will be such that the depressions automatically iron themselves out or the material will flow back to substantially its original position.

An organic material satisfactory for this purpose is coal tar pitch having a melting point high enough to prevent its softening appreciably in sunlight but low enough to prevent damage to the airplane tires upon contact with it. A melting point between 200° F. and 250° F. would, under some conditions, be satisfactory, but such range of temperatures may vary in accordance with the organic materials selected and the temperature conditions prevailing in the place where the material is used. Instead of coal tar pitch, asphalt, rosin, natural or synthetic waxes, various natural or synthetic resins and pitches, or any desired combination of these materials may be used to advantage.

In practice, the runway bed A which has previously been prepared of concrete or other suitable material, is coated as shown at B with the selected organic material to a sufficient depth that the energy released upon landing of the airplane will cause the material to soften, melt or become substantially plastic and to reach a temperature in so doing that will be less than the temperature required appreciably to damage, injure or decompose the tires. The thickness of the surface will vary according to the traffic which it is to sustain. In the case of very heavy bombing planes, the surface should be of greater thickness than in the case of lighter aircraft. Due to the inherent nature of the materials above mentioned, they tend automatically to assume their normal shape or contour although some work may be necessary in order to maintain the surface entirely free from ruts or inequalities.

It is to be understood that the word "rubber" as used in the claims is not confined solely to ordinary gum rubber but extends also to other materials having similar characteristics and includes synthetic rubber.

What I claim is:

1. A landing runway for airplanes comprising a relatively hard bed, and a surface coating on said bed of coal tar pitch adapted to be rendered substantially plastic by heat generated upon contact therewith by rubber airplane tires during landing operations of the plane.

2. A landing runway for airplanes comprising a relatively hard bed, and a surface layer on said bed of a thermoplastic organic resin which has a melting point high enough to withstand the heat of the sun and low enough to prevent damage to rubber tires during landing operations, whereby said resin is rendered plastic by the heat generated on contact therewith of the rubber airplane tires during the landing operations of the plane.

3. A landing runway for airplanes as claimed in claim 2, in which the thermoplastic organic resin comprises a natural thermoplastic resinous material.

4. A landing runway for airplanes as claimed in claim 2, in which the thermoplastic organic resin comprises a thermoplastic synthetic resinous material.

5. A landing runway for airplanes comprising a relatively hard bed, and a surface layer on said bed of a thermoplastic asphaltic material which has a melting point high enough to withstand the heat of the sun and low enough to prevent damage to rubber tires during landing operations, whereby said material is rendered plastic by the heat generated on contact therewith of the rubber airplane tires during landing operations of the plane.

6. A landing runway for airplanes comprising a relatively hard bed, and a surface layer on said bed of a waxeous organic material which has a melting point high enough to withstand the heat of the sun and low enough to prevent damage to rubber tires during landing operations, whereby said material is rendered plastic by the heat generated on contact therewith of the rubber airplane tires during landing operations of the plane.

CHARLES R. FABEN.